(12) United States Patent
Bratman et al.

(10) Patent No.: US 12,500,927 B2
(45) Date of Patent: *Dec. 16, 2025

(54) FEDERATED DATABASE FOR ESTABLISHING AND TRACKING RISK OF INTERACTIONS WITH THIRD PARTIES

(71) Applicant: Abnormal AI, Inc., Las Vegas, NV (US)

(72) Inventors: Jeshua Alexis Bratman, New York, NY (US); Yu Zhou Lee, San Francisco, CA (US); Lawrence Stockton Moore, San Francisco, CA (US); Rami Faris Habal, San Francisco, CA (US); Lei Xu, New York, NY (US)

(73) Assignee: Abnormal AI, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,637

(22) Filed: Aug. 24, 2022

(65) Prior Publication Data
US 2022/0407887 A1  Dec. 22, 2022

Related U.S. Application Data

(60) Continuation of application No. 17/401,161, filed on Aug. 12, 2021, now Pat. No. 11,477,235, which is a
(Continued)

(51) Int. Cl.
*H04L 9/40* (2022.01)
*G06F 16/25* (2019.01)
(Continued)

(52) U.S. Cl.
CPC ........ *H04L 63/1483* (2013.01); *G06F 16/256* (2019.01); *G06F 16/335* (2019.01);
(Continued)

(58) Field of Classification Search
CPC . H04L 63/1483; H04L 51/212; H04L 51/214; H04L 63/14; H04L 63/1408;
(Continued)

(56) References Cited

U.S. PATENT DOCUMENTS 5,999,932 A   12/1999  Paul
6,023,723 A    2/2000  Mccormick
(Continued)

FOREIGN PATENT DOCUMENTS

CN         107315954      11/2017

OTHER PUBLICATIONS

Barngrover, Adam, 'Vendor Access Management with IGA', Saviynt Inc. Apr. 24, 2019 (Apr. 24, 2019) Retrieved on Apr. 17, 2021 (Apr. 17, 2021) from <https://saviynt.com/vendor-access-management-with-iga/> entire document, 2 pp.
(Continued)

*Primary Examiner* — Ramy M Osman
(74) *Attorney, Agent, or Firm* — Van Pelt, Yi & James LLP

(57) ABSTRACT

Introduced here are computer programs and computer-implemented techniques for generating and then managing a federated database that can be used to ascertain the risk in interacting with vendors. At a high level, the federated database allows knowledge regarding the reputation of vendors to be shared amongst different enterprises with which those vendors may interact. A threat detection platform may utilize the federated database when determining how to handle incoming emails from vendors.

20 Claims, 10 Drawing Sheets

Related U.S. Application Data division of application No. 17/185,570, filed on Feb. 25, 2021, now Pat. No. 11,477,234, application No. 17/894,637, filed on Aug. 24, 2022 is a continuation of application No. 17/401,143, filed on Aug. 12, 2021, now Pat. No. 11,483,344, which is a division of application No. 17/185,570, filed on Feb. 25, 2021, now Pat. No. 11,477,234.

(60) Provisional application No. 62/983,444, filed on Feb. 28, 2020.

(51) Int. Cl.
  *G06F 16/335* (2019.01)
  *G06Q 10/0635* (2023.01)
  *G06Q 10/107* (2023.01)
  *H04L 51/212* (2022.01)
  *H04L 51/214* (2022.01)
  *H04L 67/30* (2022.01)
  *H04L 67/50* (2022.01)

(52) U.S. Cl.
  CPC ....... *G06Q 10/0635* (2013.01); *G06Q 10/107* (2013.01); *H04L 51/212* (2022.05); *H04L 51/214* (2022.05); *H04L 63/14* (2013.01); *H04L 63/1408* (2013.01); *H04L 63/1433* (2013.01); *H04L 63/1441* (2013.01); *H04L 67/30* (2013.01); *H04L 67/535* (2022.05)

(58) Field of Classification Search
  CPC . H04L 63/1433; H04L 63/1441; H04L 67/30; H04L 67/535; H04L 51/222; H04L 63/0236; G06F 16/256; G06F 16/335; G06Q 10/0635; G06Q 10/107
  See application file for complete search history.

(56) References Cited

U.S. PATENT DOCUMENTS

| | | | |
|---|---|---|---|
| 6,088,717 A | 7/2000 | Reed | |
| 6,807,569 B1 * | 10/2004 | Bhimani | H04L 63/1425 705/64 |
| 7,263,506 B2 | 8/2007 | Lee | |
| 7,451,487 B2 | 11/2008 | Oliver | |
| 7,610,344 B2 | 10/2009 | Mehr | |
| 7,953,814 B1 | 5/2011 | Chasin | |
| 8,037,144 B2 * | 10/2011 | Lund | H04L 51/212 709/206 |
| 8,112,484 B1 | 2/2012 | Sharma | |
| 8,244,532 B1 | 8/2012 | Begeja | |
| 8,566,938 B1 | 10/2013 | Prakash | |
| 8,819,819 B1 | 8/2014 | Johnston | |
| 8,935,788 B1 | 1/2015 | Diao | |
| 8,997,226 B1 * | 3/2015 | Call | H04L 63/1483 709/224 |
| 9,009,824 B1 | 4/2015 | Chen | |
| 9,154,514 B1 | 10/2015 | Prakash | |
| 9,213,827 B2 | 12/2015 | Li | |
| 9,245,115 B1 | 1/2016 | Jakobsson | |
| 9,245,225 B2 | 1/2016 | Winn | |
| 9,264,418 B1 | 2/2016 | Crosley | |
| 9,348,981 B1 | 5/2016 | Hearn | |
| 9,473,437 B1 | 10/2016 | Jakobsson | |
| 9,516,053 B1 | 12/2016 | Muddu | |
| 9,537,880 B1 | 1/2017 | Jones | |
| 9,571,512 B2 | 2/2017 | Ray | |
| 9,686,308 B1 | 6/2017 | Srivastava | |
| 9,756,007 B1 | 9/2017 | Stringhini | |
| 9,774,626 B1 * | 9/2017 | Himler | H04L 63/1483 |
| 9,781,152 B1 | 10/2017 | Mistratov | |
| 9,847,973 B1 | 12/2017 | Jakobsson | |
| 9,940,394 B1 | 4/2018 | Grant | |
| 9,946,789 B1 | 4/2018 | Li | |
| 9,954,805 B2 | 4/2018 | Nigam | |
| 9,961,096 B1 | 5/2018 | Pierce | |
| 9,967,268 B1 | 5/2018 | Hewitt | |
| 10,015,182 B1 | 7/2018 | Shintre | |
| 10,026,049 B2 * | 7/2018 | Asenjo | H04L 63/14 |
| 10,044,745 B1 | 8/2018 | Jones | |
| 10,091,312 B1 | 10/2018 | Khanwalkar | |
| 10,104,029 B1 | 10/2018 | Chambers | |
| 10,129,194 B1 | 11/2018 | Jakobsson | |
| 10,129,288 B1 | 11/2018 | Xie | |
| 10,243,989 B1 | 3/2019 | Ding | |
| 10,250,624 B2 | 4/2019 | Mixer | |
| 10,277,628 B1 | 4/2019 | Jakobsson | |
| 10,362,057 B1 | 7/2019 | Wu | |
| 10,397,272 B1 | 8/2019 | Bruss | |
| 10,419,468 B2 | 9/2019 | Glatfelter | |
| 10,523,609 B1 | 12/2019 | Subramanian | |
| 10,601,865 B1 | 3/2020 | Mesdaq | |
| 10,616,272 B2 * | 4/2020 | Chambers | H04L 63/1466 |
| 10,673,880 B1 | 6/2020 | Pratt | |
| 10,721,195 B2 | 7/2020 | Jakobsson | |
| 10,834,127 B1 | 11/2020 | Yeh | |
| 10,880,322 B1 * | 12/2020 | Jakobsson | H04L 51/08 |
| 10,911,489 B1 | 2/2021 | Chechik | |
| 10,972,483 B2 | 4/2021 | Thomas | |
| 10,972,485 B2 | 4/2021 | Beata | |
| 11,019,076 B1 | 5/2021 | Jakobsson | |
| 11,063,897 B2 | 7/2021 | Kessler | |
| 11,153,351 B2 | 10/2021 | Kalinin | |
| 11,477,234 B2 * | 10/2022 | Bratman | H04L 63/1441 |
| 11,477,235 B2 * | 10/2022 | Bratman | H04L 63/14 |
| 11,483,344 B2 * | 10/2022 | Bratman | H04L 63/1441 |
| 11,494,421 B1 | 11/2022 | Ghafourifar | |
| 2002/0002520 A1 | 1/2002 | Gatto | |
| 2002/0116463 A1 | 8/2002 | Hart | |
| 2003/0204569 A1 | 10/2003 | Andrews | |
| 2004/0030913 A1 | 2/2004 | Liang | |
| 2004/0083165 A1 * | 4/2004 | Lawrence | G06Q 40/06 705/38 |
| 2004/0117450 A1 | 6/2004 | Campbell | |
| 2004/0128355 A1 | 7/2004 | Chao | |
| 2004/0215977 A1 | 10/2004 | Goodman | |
| 2004/0260922 A1 | 12/2004 | Goodman | |
| 2005/0039019 A1 | 2/2005 | Delany | |
| 2005/0081059 A1 * | 4/2005 | Bandini | H04L 63/0245 726/4 |
| 2005/0187934 A1 | 8/2005 | Motsinger | |
| 2005/0198518 A1 | 9/2005 | Kogan | |
| 2006/0036698 A1 | 2/2006 | Hebert | |
| 2006/0053203 A1 | 3/2006 | Mijatovic | |
| 2006/0191012 A1 | 8/2006 | Banzhof | |
| 2006/0253581 A1 | 11/2006 | Dixon | |
| 2007/0074169 A1 | 3/2007 | Chess | |
| 2007/0276851 A1 | 11/2007 | Friedlander | |
| 2008/0005249 A1 | 1/2008 | Hart | |
| 2008/0086532 A1 | 4/2008 | Cunningham | |
| 2008/0114684 A1 | 5/2008 | Foster | |
| 2008/0201401 A1 | 8/2008 | Pugh | |
| 2009/0037350 A1 | 2/2009 | Rudat | |
| 2009/0132490 A1 | 5/2009 | Okraglik | |
| 2010/0115040 A1 | 5/2010 | Sargent | |
| 2010/0211641 A1 | 8/2010 | Yih | |
| 2010/0318614 A1 | 12/2010 | Sager | |
| 2011/0015969 A1 * | 1/2011 | Loeb | G06Q 10/00 715/764 |
| 2011/0173142 A1 | 7/2011 | Dasgupta | |
| 2011/0179126 A1 | 7/2011 | Wetherell | |
| 2011/0213869 A1 | 9/2011 | Korsunsky | |
| 2011/0214157 A1 | 9/2011 | Korsunsky | |
| 2011/0231510 A1 | 9/2011 | Korsunsky | |
| 2011/0231564 A1 | 9/2011 | Korsunsky | |
| 2011/0238855 A1 | 9/2011 | Korsunsky | |
| 2012/0028606 A1 | 2/2012 | Bobotek | |
| 2012/0110672 A1 | 5/2012 | Judge | |
| 2012/0137367 A1 | 5/2012 | Dupont | |
| 2012/0233662 A1 | 9/2012 | Scott-Cowley | |
| 2012/0278887 A1 | 11/2012 | Krish | |
| 2012/0290712 A1 | 11/2012 | Walter | |

(56) References Cited

U.S. PATENT DOCUMENTS

| | | |
|---|---|---|
| 2012/0297484 A1 | 11/2012 | Srivastava |
| 2013/0041955 A1 | 2/2013 | Chasin |
| 2013/0086180 A1 | 4/2013 | Midgen |
| 2013/0086261 A1 | 4/2013 | Lim |
| 2013/0097709 A1 | 4/2013 | Basavapatna |
| 2013/0167207 A1 | 6/2013 | Davis |
| 2013/0191759 A1 | 7/2013 | Bhogal |
| 2014/0013441 A1 | 1/2014 | Hencke |
| 2014/0032589 A1 | 1/2014 | Styler |
| 2014/0181223 A1 | 6/2014 | Homsany |
| 2014/0325662 A1 | 10/2014 | Foster |
| 2014/0365303 A1 | 12/2014 | Vaithilingam |
| 2014/0379825 A1 | 12/2014 | Speier |
| 2014/0380478 A1 | 12/2014 | Canning |
| 2015/0026027 A1 | 1/2015 | Priess |
| 2015/0128274 A1 | 5/2015 | Giokas |
| 2015/0143456 A1 | 5/2015 | Raleigh |
| 2015/0161609 A1 | 6/2015 | Christner |
| 2015/0161611 A1 | 6/2015 | Duke |
| 2015/0228004 A1 | 8/2015 | Bednarek |
| 2015/0234831 A1 | 8/2015 | Prasanna Kumar |
| 2015/0237068 A1 | 8/2015 | Sandke |
| 2015/0295942 A1 | 10/2015 | Tao |
| 2015/0295945 A1 | 10/2015 | Canzanese, Jr. |
| 2015/0319157 A1 | 11/2015 | Sherman |
| 2015/0339477 A1 | 11/2015 | Abrams |
| 2015/0341795 A1* | 11/2015 | Tang ............... H04L 51/04 726/22 |
| 2016/0014151 A1 | 1/2016 | Prakash |
| 2016/0021139 A1* | 1/2016 | Stephan ........... H04L 63/02 726/1 |
| 2016/0036829 A1 | 2/2016 | Sadeh-Koniecpol |
| 2016/0057167 A1 | 2/2016 | Bach |
| 2016/0063277 A1 | 3/2016 | Vu |
| 2016/0156654 A1 | 6/2016 | Chasin |
| 2016/0227367 A1 | 8/2016 | Alsehly |
| 2016/0253598 A1 | 9/2016 | Yamada |
| 2016/0262128 A1 | 9/2016 | Hailpern |
| 2016/0301705 A1* | 10/2016 | Higbee ............. H04L 51/42 |
| 2016/0306812 A1 | 10/2016 | Mchenry |
| 2016/0321243 A1 | 11/2016 | Walia |
| 2016/0328526 A1 | 11/2016 | Park |
| 2016/0344770 A1 | 11/2016 | Verma |
| 2016/0380936 A1 | 12/2016 | Gunasekara |
| 2017/0041296 A1 | 2/2017 | Ford |
| 2017/0048273 A1 | 2/2017 | Bach |
| 2017/0098219 A1 | 4/2017 | Peram |
| 2017/0111506 A1 | 4/2017 | Strong |
| 2017/0186112 A1 | 6/2017 | Polapala |
| 2017/0214701 A1 | 7/2017 | Hasan |
| 2017/0222960 A1 | 8/2017 | Agarwal |
| 2017/0223046 A1 | 8/2017 | Singh |
| 2017/0230323 A1 | 8/2017 | Jakobsson |
| 2017/0230403 A1 | 8/2017 | Kennedy |
| 2017/0237754 A1 | 8/2017 | Todorovic |
| 2017/0237776 A1 | 8/2017 | Higbee |
| 2017/0251006 A1 | 8/2017 | Larosa |
| 2017/0289191 A1 | 10/2017 | Thioux |
| 2017/0324767 A1 | 11/2017 | Srivastava |
| 2017/0346853 A1 | 11/2017 | Wyatt |
| 2018/0026926 A1 | 1/2018 | Nigam |
| 2018/0027006 A1 | 1/2018 | Zimmermann |
| 2018/0084003 A1 | 3/2018 | Uriel |
| 2018/0084013 A1 | 3/2018 | Dalton |
| 2018/0091453 A1 | 3/2018 | Jakobsson |
| 2018/0091476 A1 | 3/2018 | Jakobsson |
| 2018/0159808 A1 | 6/2018 | Pal |
| 2018/0165936 A1* | 6/2018 | Smith ............... G06F 11/3013 |
| 2018/0189347 A1 | 7/2018 | Ghafourifar |
| 2018/0196942 A1 | 7/2018 | Kashyap |
| 2018/0219888 A1 | 8/2018 | Apostolopoulos |
| 2018/0227324 A1 | 8/2018 | Chambers |
| 2018/0278627 A1* | 9/2018 | Goutal ............. H04L 63/1416 |
| 2018/0295146 A1 | 10/2018 | Kovega |
| 2018/0324297 A1 | 11/2018 | Kent |
| 2018/0330381 A1* | 11/2018 | Williams ............ H04L 63/1416 |
| 2018/0375814 A1 | 12/2018 | Hart |
| 2019/0014143 A1 | 1/2019 | Syme |
| 2019/0026461 A1 | 1/2019 | Cidon |
| 2019/0028509 A1 | 1/2019 | Cidon |
| 2019/0052655 A1 | 2/2019 | Benishti |
| 2019/0065748 A1 | 2/2019 | Foster |
| 2019/0068616 A1 | 2/2019 | Woods |
| 2019/0081983 A1 | 3/2019 | Teal |
| 2019/0087428 A1 | 3/2019 | Crudele |
| 2019/0089711 A1 | 3/2019 | Faulkner |
| 2019/0104154 A1 | 4/2019 | Kumar |
| 2019/0109863 A1 | 4/2019 | Traore |
| 2019/0141183 A1 | 5/2019 | Chandrasekaran |
| 2019/0166161 A1 | 5/2019 | Anand |
| 2019/0166162 A1 | 5/2019 | Anand |
| 2019/0190929 A1 | 6/2019 | Thomas |
| 2019/0190936 A1 | 6/2019 | Thomas |
| 2019/0199745 A1* | 6/2019 | Jakobsson ........... H04L 63/1483 |
| 2019/0205511 A1 | 7/2019 | Zhan |
| 2019/0222606 A1 | 7/2019 | Schweighauser |
| 2019/0238571 A1 | 8/2019 | Adir |
| 2019/0260780 A1 | 8/2019 | Matthew |
| 2019/0311121 A1 | 10/2019 | Martin |
| 2019/0319905 A1 | 10/2019 | Baggett |
| 2019/0319987 A1 | 10/2019 | Levy |
| 2019/0349400 A1 | 11/2019 | Bruss |
| 2019/0384911 A1 | 12/2019 | Caspi |
| 2020/0007502 A1 | 1/2020 | Everton |
| 2020/0021609 A1 | 1/2020 | Kuppanna |
| 2020/0044851 A1 | 2/2020 | Everson |
| 2020/0053111 A1 | 2/2020 | Jakobsson |
| 2020/0053120 A1 | 2/2020 | Wilcox |
| 2020/0068031 A1 | 2/2020 | Kursun |
| 2020/0074078 A1 | 3/2020 | Saxe |
| 2020/0076825 A1 | 3/2020 | Vallur |
| 2020/0125725 A1 | 4/2020 | Petersen |
| 2020/0127962 A1 | 4/2020 | Chuhadar |
| 2020/0162483 A1 | 5/2020 | Farhady |
| 2020/0204572 A1 | 6/2020 | Jeyakumar |
| 2020/0250315 A1* | 8/2020 | Sunkavally ......... G06F 21/6254 |
| 2020/0287936 A1 | 9/2020 | Nguyen |
| 2020/0304536 A1* | 9/2020 | Mahabir ............. H04L 63/1475 |
| 2020/0344251 A1 | 10/2020 | Jeyakumar |
| 2020/0358804 A1 | 11/2020 | Crabtree |
| 2020/0374251 A1 | 11/2020 | Warshaw |
| 2020/0389486 A1 | 12/2020 | Jeyakumar |
| 2020/0396190 A1 | 12/2020 | Pickman |
| 2020/0396258 A1 | 12/2020 | Jeyakumar |
| 2020/0412767 A1 | 12/2020 | Crabtree |
| 2021/0021612 A1 | 1/2021 | Higbee |
| 2021/0058395 A1 | 2/2021 | Jakobsson |
| 2021/0091962 A1 | 3/2021 | Finke |
| 2021/0092154 A1 | 3/2021 | Kumar |
| 2021/0168161 A1 | 6/2021 | Dunn |
| 2021/0240836 A1 | 8/2021 | Hazony |
| 2021/0272066 A1 | 9/2021 | Bratman |
| 2021/0295179 A1 | 9/2021 | Eyal Altman |
| 2021/0329035 A1 | 10/2021 | Jeyakumar |
| 2021/0336983 A1 | 10/2021 | Lee |
| 2021/0360027 A1 | 11/2021 | Boyer |
| 2021/0374679 A1 | 12/2021 | Bratman |
| 2021/0374680 A1 | 12/2021 | Bratman |
| 2021/0390181 A1* | 12/2021 | McClay ............. H04L 63/1483 |
| 2022/0021700 A1 | 1/2022 | Devlin |
| 2022/0407887 A1* | 12/2022 | Bratman ................. H04L 67/30 |

OTHER PUBLICATIONS

Information Security Media Group, 'Multi-Channel Fraud: A Defense Plan', Retrieved on Apr. 18, 2021 (Apr. 18, 2021) from <https://www.bankInfosecurity.com/Interviews/multi-channel-fraud-defense-plan-i-1799>, Feb. 20, 2013, 9 pages.

International Search Report and Written Opinion mailed Apr. 24, 2020 of PCT/US2019/067279 (14 pages).

Mahajan, et al., 'Finding HTML Presentation Failures Using Image Comparison Techniques', ASE'14, pp. 91-98 (Year: 2014).

(56) References Cited

OTHER PUBLICATIONS

Mont, Marco Casassa, 'Towards accountable management of identity and privacy: Sticky policies and enforceable tracing services', 14th International Workshop on Database and Expert Systems Applications, 2003. Proceedings. IEEE, 2003. Mar. 19, 2003 (Mar. 19, 2003), Retrieved on Apr. 17, 2021 (Apr. 17, 2021) from <https://ieeexplore.ieee.org/abstract/documenV1232051> entire document, Mar. 19, 2003, 17 pp.

Proofpoint (Proofpoint Closed-Loop Email Analysis and Response, Aug. 2018, 2 pages) (Year: 2018).

* cited by examiner

| Vendor Profile | Risk Level | Vendor Contact | Company Contact(s) | Last Contacted | |
|---|---|---|---|---|---|
| Profia Systems | 9/10 | 4 Contacts | 2 Contacts | 2 months ago<br>July 27 3:47PM PDT | ⚠ Recent Compromise |
| Betawear Corporation | 1/10 | 2 Contacts | 5 Contacts | 2 months ago<br>July 27 3:47PM PDT | |
| Prestige Universal | 9/10 | 2 Contacts | 5 Contacts | 2 months ago<br>July 27 3:47PM PDT | ⚠ Recent Spoofing |
| American Tire Company | 7/10 | 2 Contacts | 5 Contacts | 2 months ago<br>July 27 3:47PM PDT | ⚠ Recent Spoofing |
| Ascent Financials | 7/10 | 2 Contacts | 5 Contacts | 2 months ago<br>July 27 3:47PM PDT | ⚠ Recent Spoofing |
| Homewood Medical Group | 5/10 | 2 Contacts | 5 Contacts | 2 months ago<br>July 27 3:47PM PDT | ⚠ Recent Phishing Campaign |
| American Tire Company | 7/10 | 2 Contacts | 5 Contacts | 2 months ago<br>July 27 3:47PM PDT | ⚠ Recent Spoofing |
| Ascent Financials | 7/10 | 2 Contacts | 5 Contacts | 2 months ago<br>July 27 3:47PM PDT | ⚠ Recent Spoofing |
| Homewood Medical Group | 5/10 | 2 Contacts | 5 Contacts | 2 months ago<br>July 27 3:47PM PDT | ⚠ Recent Phishing Campaign |
| Ascent Financials | 5/10 | 2 Contacts | 5 Contacts | 2 months ago<br>July 27 3:47PM PDT | ⚠ Recent Phishing Campaign |
| Homewood Medical Group | 5/10 | 2 Contacts | 5 Contacts | 2 months ago<br>July 27 3:47PM PDT | ⚠ Recent Phishing Campaign |

700

701
Obtain an email that is addressed to an email account associated with an enterprise 702
Establish that the email is representative of an instance of outreach by a vendor 703
Access a federated database to identify a digital profile that is associated with the vendor 704
Determine, based on the digital profile, how to handle the email 705
Cause display of a notification by a computer program that specifies how the email was handled 706
Receive, through the computer program, input indicative of a request to examine the digital profile associated with the vendor 707
Cause display of an interface by the computer program that includes a summary of the digital profile

801
Examine emails that are addressed to employees of multiple enterprises to discover a series of emails that represent instances of outreach by multiple vendors 802
Produce a metric for each vendor that is indicative of the risk in interacting with that vendor based on an analysis of all emails in the series of emails that involve that vendor 803
Assign a classification to each vendor based on the corresponding metric 804
Generate a federated database for the multiple vendors by populating entries in a data structure with information regarding those vendors 805
Cause display of a visual representation of the federated database that conveys the risk in communicating with each vendor in a visual manner

901
Obtain an email that originates from a domain associated with a vendor

902
Apply a model to the email to establish whether the email represents a risk to a recipient to whom the email is addressed 903
Determine that the email is malicious based on an output produced by the model 904
Create a digital profile for the vendor by populating a data structure with information regarding a feature of the email that influenced the output produced by the model 905
Store the digital profile in a federated database that includes a series of digital profiles

FIGURE 9

FEDERATED DATABASE FOR ESTABLISHING AND TRACKING RISK OF INTERACTIONS WITH THIRD PARTIES

CROSS-REFERENCE TO RELATED APPLICATIONS

This application is a continuation of U.S. patent application Ser. No. 17/401,161, titled "Approaches to Creating, Managing, and Applying a Federated Database to Establish Risk Posed by Third Parties" and filed on Aug. 12, 2021, which is a divisional of U.S. patent application Ser. No. 17/185,570, titled "Federated Database for Establishing and Tracking Risk of Interactions With Third Parties" and filed on Feb. 25, 2021, which claims priority to U.S. Provisional Application No. 62/983,444, titled "Federated Vendor Database for Tracking the Reputation of Third Parties" and filed on Feb. 28, 2020, each of which is incorporated by reference herein in its entirety.

This application is also a continuation of U.S. patent application Ser. No. 17/401,143, titled "Estimating Risk Posed by Interacting With Third Parties Through Analysis of Emails Addressed to Employees of Multiple Enterprises" and filed on Aug. 12, 2021, which is a divisional of U.S. patent application Ser. No. 17/185,570, titled "Federated Database for Establishing and Tracking Risk of Interactions With Third Parties" and filed on Feb. 25, 2021, which claims priority to U.S. Provisional Application No. 62/983,444, titled "Federated Vendor Database for Tracking the Reputation of Third Parties" and filed on Feb. 28, 2020, each of which is incorporated by reference herein in its entirety.

TECHNICAL FIELD

Various embodiments concern computer programs and associated computer-implemented techniques for generating and then managing databases that can be used to ascertain the risk in interacting with entities over email.

BACKGROUND

Email has become vastly more sophisticated with the Internet connecting millions of individuals in real time. These advancements in connectivity have incentivized cyber actors (also referred to as "attackers") to send malicious emails in greater numbers than ever before. Because email represents the primary communication channel for most enterprises (also referred to as "companies" or "organizations"), it is a primary point of entry for attackers.

Historically, enterprises employed secure email gateways to protect on-premises email. A secure email gateway is a mechanism—implemented in hardware or software—that monitors inbound and outbound emails to prevent the transmission of unwanted emails. However, such an approach is largely unsuitable for examining the vast number of emails handled by collaboration suites such as Microsoft Office 365® and Google Workspace™. For that reason, enterprises have begun employing security operations center (SOC) analysts who use various security products to inhibit and/or handle email scams. Examples of email scams include phishing campaigns and business email compromise (BEC) campaigns. As an example, some enterprises define, prioritize, and respond to incidents through an approach referred to as mail-focused Security Orchestration, Automation, and Response (M-SOAR).

BRIEF DESCRIPTION OF THE DRAWINGS

FIG. 3 includes an example of an interface with a visual representation of a profile for a vendor in a federated database.

FIG. 4 includes an example of an interface with a list view of the digital profiles in the federated database.

FIG. 7 includes a flow diagram of a process for using a federated database to determine how to handle an email that is transmitted from a vendor to an enterprise.

FIG. 8 includes a flow diagram of a process for generating a federated database from insights gained through examination of emails addressed to multiple enterprises.

FIG. 9 includes a flow diagram of a process for creating a federated database that can be used to establish the risk in interacting with vendors.

Figure 1:
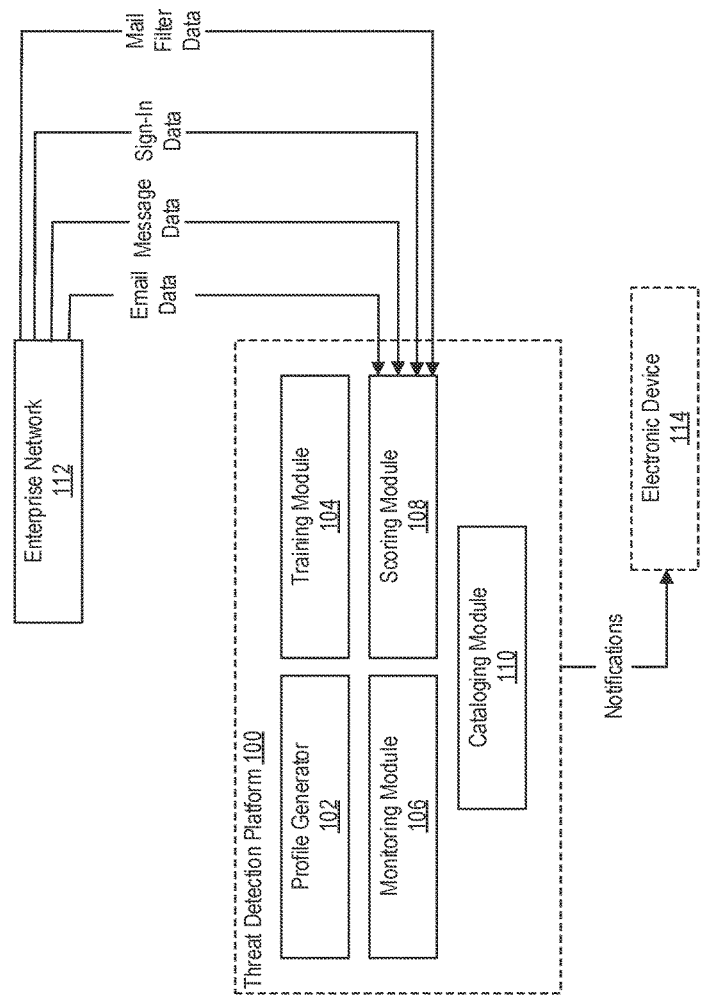
FIG. 1 depicts an example of a threat detection platform 100 that is able to inspect digital communications, such as emails, to discover indicators of compromise (IOCs).

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Traditionally, enterprises have protected themselves against business email compromise (BEC) campaigns by employing various defenses. For example, an enterprise may employ a filter that quarantines malicious emails, a whitelist that identifies non-malicious domains, a blacklist that identifies malicious domains, or an identification scheme that causes internal emails to be visually distinguishable from external emails. These approaches are largely ineffective against some BEC campaigns, however. For example, instances of vendor account compromise (VAC) (also referred to as "vendor email compromise" or "VEC") cannot be readily discovered or addressed by these approaches. In a VAC attack, the threat originates from an email account associated with a vendor but has been compromised. Because the email account is legitimate, malicious emails originating therefrom will proceed through security products—like filters, whitelists, and blacklists—without issue. But this is problematic due to the significant threat of vendor impersonation.

To address this issue, some enterprises have begun employing security operations center (SOC) analysts who are responsible for discovering these VAC attacks and then performing whatever actions are necessary to protect those enterprises. For example, upon discovering that an email sent with a given email account (or simply "account") associated with a vendor indicates that the given account may be compromised, a SOC analyst may create a rule that will detect other emails sent with the given account.

There are two downsides to this approach, however. The first downside is that VAC attacks tend to be very difficult to detect. Even trained SOC analysts may be unable to detect VAC attacks upon visual examination of emails. Not only do these emails typically contain convincing details (e.g., information about the vendor), but the style, structure, and format will be less familiar to the SOC analysts. In short, the SOC analyst may struggle to determine whether emails from most vendors are unusual due to the infrequent nature of communication with those vendors. The second downside is that VAC attacks tend to be identified, monitored, and then addressed in a siloed manner. Assume, for example, that SOC analysts employed by a first enterprise discover that an account associated with a given vendor appears to have been compromised. SOC analysts employed by a second enterprise may be completely unaware of this discovery, and thus may not inhibit or prevent interactions with the given vendor until harm has occurred.

Introduced here are computer programs and computer-implemented techniques for generating and then managing a federated database that can be used to ascertain the risk in interacting with vendors. At a high level, the federated database allows knowledge regarding the reputation of vendors to be shared amongst different enterprises with which those vendors may interact. As further discussed below, a threat detection platform (or simply "platform") may utilize the federated database when determining how to handle incoming emails from vendors.

A federated database can be associated with multiple enterprises whose emails are examined by the threat detection platform. For instance, the threat detection platform may be responsible for examining emails addressed to the employees of multiple enterprises (e.g., Enterprise A and Enterprise B). Based on information gleaned from those emails, the threat detection platform can generate and/or manage the federated database. As an example, if the threat detection platform determines that an account associated with a vendor is likely compromised based on an analysis of an email sent with the account, then the threat detection platform may create or update an entry for the vendor in the federated database. In some embodiments, the threat detection platform maintains a single federated database for all enterprises. In other embodiments, the threat detection platform maintains multiple federated databases. For example, the threat detection platform may maintain a first federated database that is shared amongst entities related to a first field (e.g., social networking), a second federated database that is shared amongst entities related to a second field (e.g., banking), etc.

Thus, the federated database may act as a central repository where information regarding indicators of compromise (IOCs) can be shared so as to enable preventative action before VAC attacks are successful. For example, the federated database may be used by SOC analysts who are tasked with determining whether to permit interaction with a vendor. As another example, the federated database may be used by a security product (e.g., a filter) that is tasked with determining whether to permit interaction with a vendor.

In sum, a threat detection platform may be able to address several types of threats resulting from compromise of accounts associated with a vendor (or simply "vendor accounts"). As one example, there is a high likelihood that the number of credential-based phishing attacks carried out with vendor accounts will increase. Employees often fall for these attacks due to the inherent trust gained through past interactions with the vendor. Second, there is a high likelihood that the number of financial fraud attacks will increase. In a financial fraud attack, the attacker normally doesn't have control over a vendor account but instead uses obfuscation (e.g., a lookalike domain) to impersonate a vendor account. Financial fraud attacks are becoming increasingly difficult to detect as (i) attackers have improved in their ability to impersonate vendors and (ii) attackers tend to "recycle" the underlying account less frequently. By using a federated database, a threat detection platform can protect against these types of attacks in a more consistent, reliable manner.

Embodiments may be described in the context of computer-executable instructions for the purpose of illustration. However, aspects of the technology can be implemented via hardware, firmware, or software. As an example, a set of algorithms representative of a computer-implemented model (or simply "model") may be applied to an email in order to extract or derive information regarding its source. Upon determining that the email was sent with an account associated with a vendor, the threat detection platform can access a federated database that includes a digital profile for the vendor. The threat detection platform can then determine, based on the digital profile, how to handle the email.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The terms "comprise," "comprising," and "comprised of" are to be construed in an inclusive sense rather than an exclusive sense (i.e., in the sense of "including but not limited to"). The term "based on" is also to be construed in an inclusive sense rather than an exclusive sense. Thus, unless otherwise noted, the term "based on" is intended to mean "based at least in part on."

The terms "connected," "coupled," and variants thereof are intended to include any connection or coupling between two or more elements, either direct or indirect. The connection/coupling can be physical, logical, or a combination thereof. For example, elements may be electrically or communicatively coupled to one another despite not sharing a physical connection.

The term "module" may refer broadly to software, firmware, and/or hardware. Modules are typically functional components that generate one or more outputs based on one or more inputs. A computer program may include or utilize one or more modules. Thus, a computer program may utilize multiple modules that are responsible for completing different tasks or a single module that is responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Threat Detection Platform

One of the key steps in preventing VAC attacks is discovering compromised accounts. While embodiments are described in the context of preventing VAC attacks through the creation and implementation of profiles in a federated database, those skilled in the art will recognize that the features are similarly applicable to discovering, assessing, and cataloging instances of vendor impersonation. Thus, if a threat detection platform discovers that a vendor is being impersonated in an email, then the threat detection platform can quantify the risk accordingly. For example, the threat detection platform may store the email in a profile associated with the vendor, as well as increase a score that quantifies a risk in interacting with the vendor.

FIG. 1 depicts an example of a threat detection platform 100 that is able to inspect digital communications, such as emails, to discover IOCs. This approach allows the threat detection platform 100 to detect digital communications that originate from legitimate accounts but represent threats to the security of an enterprise. The threat detection platform 100 may include a profile generator 102, training module 104, monitoring module 106, scoring module 108, and cataloging module 110. Some embodiments of the threat detection platform 100 include a subset of these components, while other embodiments of the threat detection platform 100 include additional components that are not shown in FIG. 1.

At a high level, the threat detection platform 100 can acquire data related to the digital conduct of accounts associated with employees and then determine, based on an analysis of the data, how to handle threats in a targeted manner. The term "account" may refer to digital profiles with which employees can engage in digital activities. These digital profiles are normally used to perform activities such as exchanging emails and messages, and thus may also be referred to as "email accounts" or "messaging accounts." The term "digital conduct," meanwhile, may refer to the digital activities that are performed with those accounts. Examples of digital activities include transmitting and receiving digital communications; creating, modifying, and deleting filters to be applied to incoming digital communications; initiating sign-in activities; and the like. Examples of digital communications include emails and messages.

As shown in FIG. 1, the data may include information related to emails, messages, mail filters, and sign-in activities. Note that these data are not necessarily obtained from the same source. As an example, data related to emails may be acquired from an email service (e.g., Microsoft Exchange™) while data related to messages may be acquired from a messaging service (e.g., Slack®). Thus, the threat detection platform 100 may be able to identify threats based on an analysis of emails (e.g., the content of the body, the email address of the sender, etc.), metadata accompanying the emails (e.g., information regarding the sender, recipient, origin, time of transmission, etc.), and other suitable data.

The threat detection platform 100 can be implemented, partially or entirely, within an enterprise network 112, a remote computing environment (e.g., through which data regarding digital conduct is routed for analysis), a gateway, or another suitable location. The remote computing environment can belong to, or be managed by, the enterprise or another entity. In some embodiments, the threat detection platform 100 is integrated into the enterprise's email system (e.g., at the gateway) as part of an inline deployment. In other embodiments, the threat detection platform 100 is integrated into the enterprise's email system via an application programming interface (API) such as the Microsoft Outlook® API. In such embodiments, the threat detection platform 100 may obtain data via the API. Thus, the threat detection platform 100 can supplement and/or supplant other security products employed by the enterprise.

In a first variation, the threat detection platform 100 is maintained by a threat service (also referred to as a "security service") that has access to multiple enterprises' data. In this variation, the threat detection platform 100 can route data that is, for example, related to incoming emails to a computing environment managed by the security service. The computing environment may be an instance on Amazon Web Services® (AWS). The threat detection platform 100 may maintain one or more databases for each enterprise that include, for example, organizational charts, attribute baselines, communication patterns, and the like. Moreover, as further discussed below, the threat detection platform 100 may maintain federated databases that are shared amongst multiple entities. One example of a federated database is one that specifies vendors who have been deemed fraudulent or compromised. Other examples of federated databases include databases specifying individuals who have been deemed fraudulent or compromised, domains from which incoming emails determined to represent security threats originated, and the like. The security service may maintain different instances of the threat detection platform 100 for different enterprises, or the security service may maintain a single instance of the threat detection platform 100 for multiple enterprises. The data hosted in these instances can be obfuscated, encrypted, hashed, depersonalized (e.g., by removing personal identifying information), or otherwise secured or secreted. Accordingly, each instance of the threat detection platform 100 may only be able to access/process data related to the accounts associated with the corresponding enterprise(s).

In a second variation, the threat detection platform 100 is maintained by the enterprise whose accounts are being monitored, either remotely or on premises. In this variation, all relevant data may be hosted by the enterprise itself, and any information to be shared across multiple enterprises can be transmitted to a computing system that is maintained by the security service or a third party. For example, the threat detection platform 100 may transmit information regarding vendors that have been deemed fraudulent or compromised to a computing system that is maintained by the security service, and the computing system may populate this information into digital profiles associated with the vendors that are included in a federated database.

As shown in FIG. 1, the profile generator 102, training module 104, monitoring module 106, scoring module 108, and cataloging module 110 can be integral parts of the threat detection platform 100. Alternatively, these components could be implemented individually while operating "alongside" the threat detection platform 100. For example, the cataloging module 110 may be implemented in a remote computing environment to which the threat detection platform 100 is communicatively connected across a network. As mentioned above, the threat detection platform 100 may be implemented by a security service on behalf of an enterprise or the enterprise itself. In some embodiments, aspects of the threat detection platform 100 are enabled by a web-accessible computer program operating on a computer server or a distributed computing system. For example, an individual may be able to interface with the threat detection platform 100 through a web browser that is executing on a computing device (also referred to as an "electronic device").

The enterprise network 112 may be a mobile network, wired network, wireless network, or some other communication network maintained by the enterprise or an operator on behalf of the enterprise. The enterprise may utilize a security service to examine emails (among other things) to discover potential threats. The enterprise may grant permission to the security service to monitor the enterprise network 112 by examining emails (e.g., incoming emails or outgoing emails) and then addressing those emails that represent threats. For example, the threat detection platform 100 may be permitted to remediate the threats posed by those emails, or the threat detection platform 100 may be permitted to surface notifications regarding the threats posed by those emails.

In some embodiments, the enterprise further grants permission to the security service to obtain data regarding digital activities of the enterprise (and, more specifically, employees of the enterprise) in order to build profiles that specify communication patterns, behavioral traits, normal content of emails, etc. For example, the threat detection platform 100 may examine the emails received by employees of an enterprise from a given vendor in order to build a profile that can be used to infer whether significant variations in behavior of the given vendor have occurred. As another example, the threat detection platform 100 may examine the emails received by a given employee of an enterprise in order to build a profile that can be used to infer whether communication with a given vendor is unusual. Accordingly, the threat detection platform 100 could generate profiles for employees of the enterprise whose digital activities are under examination, as well as profiles for individuals or entities (e.g., vendors) with which the enterprise interacts.

The threat detection platform 100 may manage one or more databases in which data can be stored. Examples of such data include enterprise data (e.g., email data, message data, sign-in data, and mail filter data), remediation policies, communication patterns, behavioral traits, and the like. The data stored in the database(s) may be determined by the threat detection platform 100 (e.g., learned from data available on the enterprise network 112), provided by the enterprise, or retrieved from an external database (e.g., associated with LinkedIn®, Microsoft Office 365®, or G Suite™). The threat detection platform 100 may also store outputs produced by the various modules, including machine- and human-readable information regarding insights into threats and any remediation actions that were taken.

As shown in FIG. 1, the threat detection platform 100 may include a profile generator 102 that is responsible for generating one or more digital profiles (or simply "profiles") for the enterprise. For example, the profile generator 102 may generate a separate profile for each account associated with an employee of the enterprise based on the sign-in data, message data, email data, or mail filter data. Profiles could also be generated for business groups, organizational groups, or the enterprise as a whole. As mentioned above, the profile generator 102 may also be able to generate profiles for individuals or entities that are external to the enterprise. For example, the profile generator 102 may be responsible for generating a profile for each vendor with which employees of the enterprise interact. Normally, this profile is based on the content and characteristics of incoming emails originating from accounts that are associated with the vendor, though this profile could also be based on the content and characteristics of outgoing emails addressed to accounts that are associated with the vendor.

By examining the data obtained from the enterprise network 112, the profile generator 102 can discover organizational information (e.g., employees, titles, and hierarchy), employee behavioral traits (e.g., based on historical emails, messages, and historical mail filters), normal content of incoming and outgoing emails, behavioral patterns (e.g., when each employee normally logs in), communication patterns (e.g., who each employee communicates with internally and externally, when each employee normally communicates), etc. This information can be populated into profiles so that each profile can be used as a baseline for what constitutes normal activity by the corresponding account (or group of accounts).

A profile could include a number of behavioral traits associated with the corresponding account. For example, the profile generator 102 may determine the behavioral traits based on the email data, message data, sign-in data, or mail filter data obtained from the enterprise network 112. The email data may include information on the senders of past emails received by a given email account, content of those past emails, frequency of those past emails, temporal patterns of those past emails, topics of those past emails, geographical location from which those past emails originated, formatting characteristics (e.g., usage of HTML, fonts, styles, etc.), and more. Thus, the profile generator 102 may attempt to build a profile for each email account that represents a model of normal behavior of the corresponding employee. As further discussed below, the profiles may be helpful in identifying the digital activities and communications that indicate a threat to the security of the enterprise may exist.

The monitoring module 106 may be responsible for monitoring communications (e.g., messages and emails) handled by the enterprise network 112. These communications may include inbound emails (e.g., external and internal emails) received by accounts associated with employees of the enterprise, outbound emails (e.g., external and internal emails) transmitted by those accounts, and messages exchanged between those accounts. In some embodiments, the monitoring module 106 is able to monitor inbound emails in near real time so that appropriate action can be taken if a malicious email is discovered. For example, if an inbound email is found to originate from an account associated with a vendor that was previously determined to be compromised (e.g., based on an output produced by the scoring module 108), then the inbound email may be at least temporarily prevented from reaching its intended destination by the monitoring module 106. In some embodiments, the monitoring module 106 is able to monitor communications only upon the threat detection platform 100 being granted permission by the enterprise (and thus given access to the enterprise network 112).

The scoring module 108 may be responsible for examining digital activities and communications to determine the likelihood that a security threat exists. For example, the scoring module 108 may examine incoming emails that are addressed to employees of an enterprise in order to identify those emails that originate from accounts associated with vendors. These emails may be representative of instances of outreach by the vendors. For each incoming email that is representative of an instance of outreach by a vendor, the scoring module 108 may produce a metric that is indicative of risk. The metric can be produced in various ways. For example, the scoring module 108 may examine each incoming email to determine how its characteristics compare to past emails received from the same vendor. In such embodiments, the scoring module 108 may determine whether characteristics such as timing, formatting, recipient, topic, and location of origination (e.g., in terms of sender email address or geographical location) match a pattern of past emails from the vendor that have been determined to be non-malicious. For instance, the scoring module 108 may determine that the likelihood of a VAC attack is high if the email includes a request for reimbursement and originates from an unusual location (e.g., where the vendor has no presence).

The scoring module 108 can make use of heuristics, rules, neural networks, or other trained machine learning (ML) algorithms such as those based on deep learning (DL), decision trees (e.g., gradient-boosted decision trees), logistic regression, and linear regression. Accordingly, the scoring module 108 may output discrete outputs or continuous outputs, such as a probability metric (e.g., specifying the likelihood that an incoming email is malicious), a binary output (e.g., malicious or non-malicious), or a classification (e.g., specifying the type of malicious email).

The cataloging module 110 (also referred to as a "recording module" or "profiling module") may be responsible for recording information regarding vendors that is gleaned by the other modules of the threat detection platform. For example, the cataloging module 110 may obtain a profile created for a vendor by the profile generator 102, populate the profile with any outputs produced by the scoring module 108, and then store the profile in a data structure. This data structure may be representative of a federated database of vendors' compromise records. As mentioned above, the federated database could also include vendors' impersonation records. As another example, the cataloging module 110 may be responsible for reporting insights derived from the outputs produced by the scoring module 108. For example, the cataloging module 110 may cause display of a notification by a computer program executing on an electronic device 114 whenever a determination is made (e.g., by the scoring module 108) that an incoming email from a vendor appears to be malicious. The electronic device 114 may be managed by the employee whose account was the intended recipient of the incoming email, an individual associated with the enterprise (e.g., a member of the information technology department), or an individual associated with a security service.

Some embodiments of the threat detection platform 100 also include a training module 104 that operates to train the models employed by the other modules. For example, the training module 104 may train the models applied by the scoring module 108 to the email data, message data, sign-in data, and mail filter data by feeding training data into those models. Additionally or alternatively, the training module 104 may use publicly available data such as, for example, records of domain age fetched from a database (e.g., that includes WHOIS information). The training data could include emails that have been labeled as malicious or non-malicious, policies related to attributes of emails (e.g., specifying that emails originating from certain domains should not be considered malicious), etc. The training data may be employee- or enterprise-specific so that the models are able to perform personalized analysis. In some embodiments, the training data ingested by the models includes emails that are known to be representative of malicious emails sent as part of an attack campaign. These emails may have been labeled as such during a training process, or these emails may have been labeled as such by other employees.

Overview of Federated Database

Various risks arise when an enterprise (and, more specifically, its employees) interact with vendors. For example, a vendor may be impersonated when one of its email accounts is compromised. The term "vendor," as used herein, may refer to an individual or entity that supplies goods or services to the enterprise. There is currently no uniform approach to identifying or quantifying these risks in connection with interactions between enterprises and vendors. This prevents informed decisions regarding whether to pursue a business relationship with a given vendor or whether to take protective countermeasures against a given vendor from being made. Further, there is no way to represent vendors relative to each other based on reputation.

Introduced here is a federated database that allows the reputation of vendors to be tracked in real time. The federated database provides an extra signal that can be used when assessing whether a vendor has been spoofed, compromised, or is otherwise not legitimate. Using the federated database, a threat detection platform can determine which actions, if any, should be taken with respect to emails received from vendors. For example, if the threat detection platform determines that a vendor has been classified as compromised, then the threat detection platform may filter incoming emails that originate from email addresses associated with the vendor. Additionally or alternatively, the threat detection platform may pay closer attention to whether any senders of incoming messages are representing themselves as the vendor, either via spoofing or some other mechanism.

One benefit of the federated database is the ability to readily determine whether there is a risk in communicating with a vendor and, if so, quantify the risk so that a more informed decision can be made. Thus, it can be readily determined whether countermeasures should be employed to protect an enterprise against a potential threat from a vendor even if the enterprise has not interacted with the vendor before. Another benefit of the federated database is the ability to compare vendors—present and potential—based on reputation so that the relative risks of interacting with those vendors can be assessed prior to engagement.

FIGS. 2-5 illustrate how information regarding a VAC attack (also referred to as a "vendor takeover attack") may be documented and then presented for review by an individual. This information may be presented on interfaces that are generated by a threat detection platform (e.g., threat detection platform 100 of FIG. 1). These interfaces may be accessible through a computer program that is executing on a computing device associated with the individual. Examples of computer programs include web browsers, desktop applications, mobile applications, and over-the-top (OTT) applications.

Figure 2:
FIG. 2 includes an example of an interface with a threat log for a vendor account compromise (VAC) attack.

FIG. 2 includes an example of an interface with a threat log for a VAC attack. Looking more closely at the content of the email deemed malicious by the threat detection platform, it can be seen that the VAC attack is related to Lucia Forman at Prolia Systems. The email was addressed to Renee West, who is an employee of Enterprise. In the body of the email, Lucia—or someone posing as Lucia—has asked to change the payment information used by Enterprise to process payments to Prolia Systems. This type of request is quite suspicious, and the threat detection platform has flagged it as such. Moreover, this is a common tactic that a compromised account associated with a vendor (or an account meant to impersonate a vendor) might use with a customer (e.g., Enterprise).

As can be seen in FIG. 2, the threat detection platform may visually indicate that the sender was found to be risky.

For example, the threat detection platform may locate a graphical element referred to as a "pill" proximate to the identity and email address of the sender.

The information shown in the section labelled "Analysis Overview" may be extracted, derived, or otherwise gleaned from the email by the threat detection platform. For example, the threat detection platform may apply models to the email and/or its accompanying metadata in order to gain insights into behavior, content, or identity. Further information on how models could be used by the threat detection platform can be found in U.S. application Ser. No. 17/094,801, titled "Discovering Email Account Compromise Through Assessments of Digital Activities," which is incorporated by reference herein in its entirety.

After establishing that the email originates from a legitimate account belonging to Prolia Systems, the threat detection platform may check a federated database to learn more about why this vendor has been classified as risky. Alternatively, the threat detection platform may receive input indicative of a selection of a graphical element on the interface (here labelled "Check VendorBase") that will redirect to the profile associated with Prolia Systems. As further discussed below, the federated database is representative of a collection of profiles associated with different vendors. These profiles may indicate the status of the vendors. That is, each profile may indicate whether the corresponding vendor is presently suspected of being compromised. Moreover, each profile may specify the risk classification assigned to the corresponding vendor by the threat detection platform.

Figure 3:
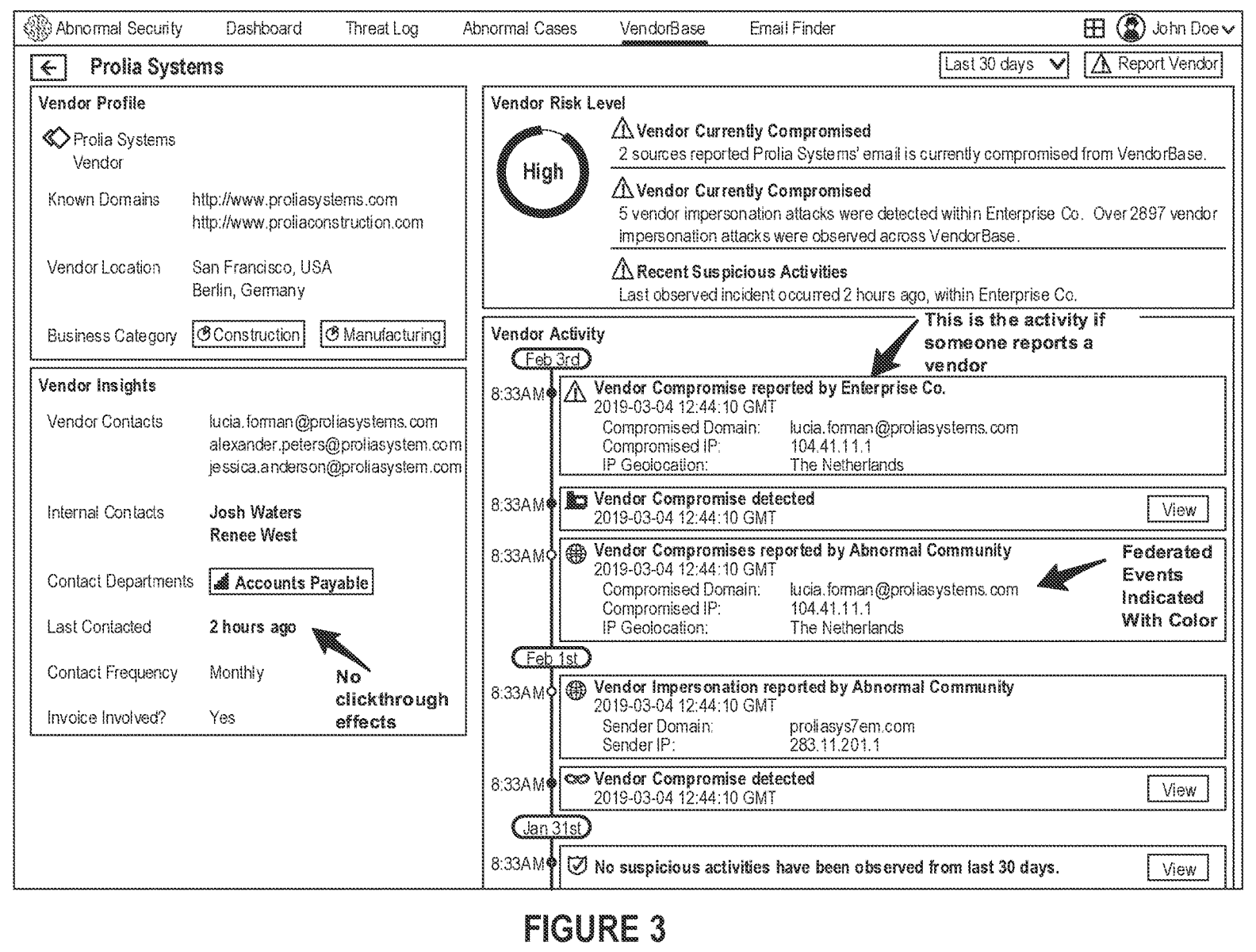

FIG. 3 includes an example of an interface with a visual representation of a profile for a vendor in a federated database. In this case, the vendor is Prolia Systems that was deemed high risk by the threat detection platform. As shown in FIG. 3, the visual representation can include various information related to the vendor. Along the left side of the interface, a vendor profile includes basic information regarding the vendor, such as its name, website, location, and business category. In this example, Prolia Systems has been categorized in the construction and manufacturing industries.

Beneath the vendor profile are vendor insights that have been uniquely found, detected, or inferred by the threat detection platform through, for example, analysis of emails addressed to employees of multiple enterprises. Examples of vendor insights include vendor contacts who have communicated on behalf of Prolia Systems, agent information that is specific to the vendor contacts, employees who have communicated with Prolia Systems, payment information (e.g., banking and routing information), last time of contact, frequency of contact, type of contact (e.g., whether payments are made between the vendor and enterprise), Internet Protocol (IP) addresses of the vendor contacts, and the like. In some embodiments, data obtained elsewhere is also incorporated into the vendor insights. For example, the vendor insights may include information regarding the BitSight score, whether there is any history of data breach, etc.

Vendor insights may be based on data that is collected by the threat detection platform or acquired by the threat detection platform from another source. For example, the threat detection platform may acquire data from a service (e.g., BitSight) via a data partnership or another product employed by the enterprise, such as an enterprise resource planning (ERP) system or customer relationship management (CRM) system. Regardless of its source, the data will be related to any of (i) the vendor, (ii) the sender of the email that has been traced to the vendor, or (iii) the history of the relationship between the vendor and enterprise in question.

Along the right side of the interface, the risk level determined for Prolia Systems is shown. The risk level is currently "high" based on analysis of recent activities involving Prolia System. As further discussed below, there are various ways in which the risk level can be conveyed. For example, the threat detection platform may classify vendors as being "low," "medium," or "high" risk, or the threat detection platform may quantify the risk of vendors using a predefined scale (e.g., 1-5, 1-10, or 1-100).

There are several reasons why the threat detection platform has determined that Prolia Systems is compromised or impersonated. First, multiple sources have reported in the federated database that Prolia Systems is acting as though it is compromised. This may occur if employees at different enterprises have flagged the activity of Prolia Systems as unusual. Second, there have been 5 impersonation attacks on Enterprise by Prolia Systems and nearly 2,900 impersonation attacks by Prolia Systems that were observed across the entities whose activities are monitored using the federated database. And third, the last incident involving Prolia Systems occurred very recently (e.g., within the last two hours). While not shown in FIG. 3, the threat detection platform may also know whether Prolia Systems has been blacklisted by any entities whose activities are monitored using the federated database. Presence on a blacklist may serve as another reason for determining that Prolia Systems is compromised.

Beneath the risk level, there is a temporal record (also referred to as a "timeline") of activities involving Prolia Systems. This temporal record may include more information regarding individual events that lead to the risk level. As shown in FIG. 3, this temporal record may include activities that have been reported by employees of the enterprise in question, activities that have been reported by employees of other enterprises, and remediation actions that have been taken by the threat detection platform. Thus, federated and non-federated content may be shown in the temporal record. Federated events may be shown in a different color than non-federated events, or federated events may be accompanied by a different logo or graphic than non-federated events. Moreover, different kinds of attacks may be shown in the temporal record. As an example, activities that represent instances of impersonation attacks may be shown in one color, while activities that represent compromise attacks may be shown in another color. As can be seen in the temporal record, no suspicious activities were observed by the threat detection platform in the 30 days preceding January 31. This means that the elevated risk level for Prolia Systems is a fairly recent change. Note that users may only be permitted to see limited information related to federated content. Assume, for example, that two enterprises (Company A, Company B) deal with a vendor (Vendor C), and that an account associated with Vendor C has attempted to defraud an employee at Company A. In such a situation, the profile corresponding to Vendor C that is visible to Company B may show an anonymized version of the event. Accordingly, Company B may be aware of the event but not who Vendor C attempted to defraud.

The duration of the temporal record may be defined by the threat detection platform or an individual. By default, activities that have occurred over the last 15, 30, or 60 days may be shown. Embodiments may utilize different intervals of time depending on whether temporality is found to improve the precision of scoring. For example, the threat detection platform may discover that analysis of activities occurring over the last 30 days may be appropriate for scoring in some cases, while the threat detection platform may discover that analysis of activities occurring over the last 60 days may be appropriate for scoring in other cases. As another example, the threat detection platform may consider "low-risk events" that have occurred over the last 30 days and "high-risk events" that have occurred over the last 60 days. Those skilled in the art will recognize that these intervals of time have been provided purely for the purpose of illustration.

Similarly, embodiments may utilize different thresholds when it comes to classifying the risk posed by interacting with a vendor. Assume, for example, that the threat detection platform is configured to output a metric between 1 and 100 that is indicative of risk, where higher numbers correspond to higher risk. Vendors with scores above a threshold (e.g., 80) may be deemed risky in some situations and not risky in other situations. Rather than rely solely on the metric itself, the threat detection platform can consider chronology by taking into account the history of the relationship between a vendor and enterprise. Activities performed by one vendor may be considered unusual, while the same activities performed by another vendor may be considered normal.

As discussed above, the threat detection platform may be responsible for addressing the risk posed by interacting with Prolia Systems on behalf of the enterprise in question. Additionally or alternatively, the enterprise may take some internal action to mitigate the risk. Examples of such actions include creating a filter so as to block incoming emails from Prolia Systems, notify employees or departments of the risk, and initiating contact with a trusted individual employed by Prolia Systems.

FIG. 4 includes an example of an interface with a list view of the digital profiles in the federated database. The list view may include information regarding some or all of the vendors included in the federated database. As shown in FIG. 4, the list view may specify the name, risk level, and other information for each vendor. For example, the list view may include (or link to) a list of vendor email addresses from which contact was initiated and/or a list of employee email addresses with which contact was initiated. The vendor email addresses may correspond to different vendor contacts, while the employee email addresses may correspond to different enterprise contacts. The list view may also include a column that shows whether the information regarding each vendor is "fresh." Whether the determination of a risk level was made based on information from several days, weeks, or months ago may impact how much individuals rely on that risk level. Moreover, the list view may include a threat summary that indicates, at a high level, why vendors were classified as risky. As an example, Prolia Systems has been classified as high risk because of its recent compromising and spoofing activities.

Figure 5:
FIG. 5 includes an example of an interface with a visual representation of a profile for another vendor in the federated database.

FIG. 5 includes an example of an interface with a visual representation of a profile for another vendor in the federated database. The layout of this interface is comparable to the interface shown in FIG. 3. However, in contrast to Prolia Systems, this vendor ("Becker Group") has been deemed low risk by the threat detection platform. Becker Group has been deemed low risk because the threat detection platform has not discovered any suspicious activities involving Becker Group over the 30 days preceding February 3. As such, interactions with the Becker Group may be considered safe for now.

As can be seen in FIG. 5, Becker Group is not presently being "watched" by the enterprise in question, though that may change if the enterprise suspects that Becker Group is involved in a suspicious activity. The enterprise (and, more specifically, an individual acting on behalf of the enterprise) may request that the activities of Becker Group be monitored, for example, by selecting the graphical element labelled "Report Vendor."

Methodologies for Creating and Employing a Federated Database

Figure 6:
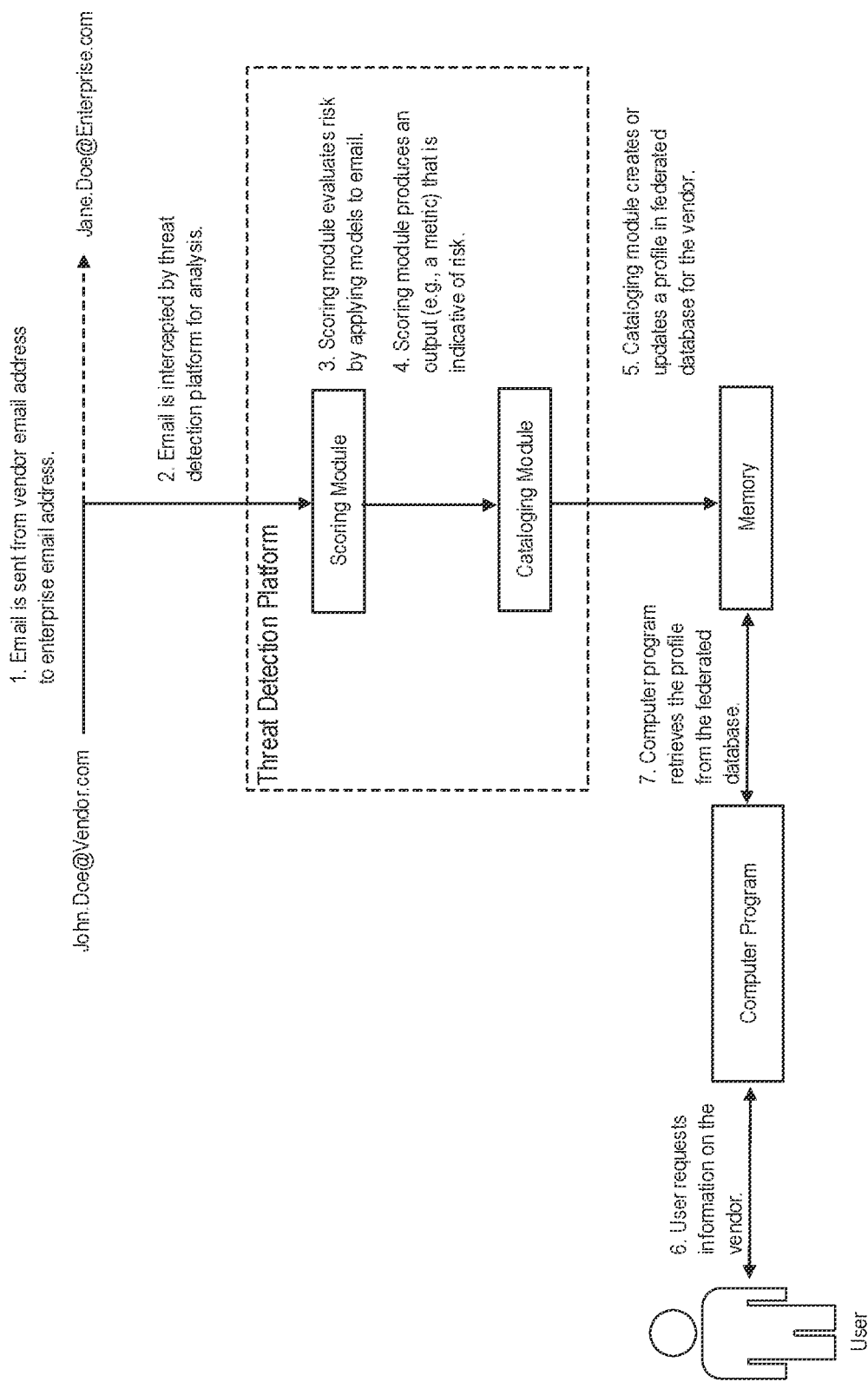
FIG. 6 includes a high-level illustration of a workflow for creating an entry in a federated database for a vendor involved in a suspicious activity.

FIG. 6 includes a high-level illustration of a workflow for creating an entry in a federated database for a vendor involved in a suspicious activity. Here, the suspicious activity is the transmission of a malicious email from a first email address associated with the vendor to a second email address associated with an enterprise whose digital conduct is being monitored by a threat detection platform. The first email address may be referred to as a "vendor email address," while the second email address may be referred to as an "enterprise email address." Normally, the enterprise email address is associated with an employee of the enterprise, and thus may also be referred to as an "employee email address."

At a high level, the threat detection platform can implement a workflow in which two procedures are performed, either sequentially or simultaneously, in order to create and then implement profiles for vendors.

In a first procedure, the threat detection platform monitors the external communications of employees of an enterprise in order to create profiles for vendors in a federated database. The term "external communication" may refer to a communication that involves an employee and another individual or entity outside of the enterprise. An individual or entity may be considered a vendor upon discovering that external communications involving that individual or entity match certain criteria (e.g., involve terms related to finances, invoices, and the like). The threat detection platform may apply a model to the external communications to make predictions from which vendor status can be inferred. Based on outputs produced by the model, the threat detection platform may be able to deduce, without human input, which individuals and entities are acting like vendors (and thus should be classified as such).

In a second procedure, the threat detection platform monitors the external communications involving the employees in order to detect, for example, incoming emails that pose a threat to the enterprise and then quantify the risk posed by those incoming emails using the federated database. Assume, for example, that the threat detection platform determines that an incoming email is malicious. In such a situation, the threat detection platform may examine the incoming email to determine whether a vendor is responsible and, if so, relate the incoming email to a profile associated with the vendor. If the profile exists, then the incoming email can be associated with the profile and a score indicative of risk in interacting with the vendor can be increased. If the profile does not exist, then a new profile can be created for the vendor based on the incoming email.

Referring again to FIG. 6, an email is initially sent from a vendor email address to an enterprise email address. A threat detection platform (e.g., threat detection platform 100 of FIG. 1) may intercept the email before it reaches its intended destination, namely, an inbox corresponding to the enterprise email address. Then, the threat detection platform can determine the risk posed by permitting communication between the vendor and enterprise email addresses. For example, a scoring module (e.g., scoring module 108 of FIG. 1) may evaluate risk by applying a model to the email or its accompanying metadata. This model may produce an output (e.g., a metric) that is indicative of the risk posed by the vendor. If the output indicates that the vendor poses little or no threat, then the threat detection platform may allow the email to continue onward toward the inbox. However, if the output indicates that the vendor poses a moderate or significant threat, then the threat detection platform may perform one or more actions to remediate the threat. For example, the threat detection platform may prevent the email from reaching the inbox, as well as creating a filter or rule that is designed to inhibit transmission of similar emails to other enterprise email addresses.

A cataloging module may be responsible for either creating or updating a profile in a federated database for the vendor so as to document the email. For example, the cataloging module may populate the profile with information related to the email. This information may include, for example, the vendor email address, enterprise email address, time of transmission, geographical location of transmission, topic, and the like. The profile may also be populated with any insights extracted, derived, or inferred by the threat detection platform from the email. For example, if the threat detection platform determines that the email was likely transmitted with a compromised email account associated with the vendor, then the threat detection may indicate as much in the profile.

One feature of the federated database is that it may permit users to search, browse, or edit the profiles stored therein. For example, a user may browse the profiles contained in the federated database through an interface generated by a computer program. The computer program may be representative of an aspect of the threat detection platform or the threat detection platform itself.

FIG. 7 includes a flow diagram of a process 700 for using a federated database to determine how to handle an email that is transmitted from a vendor to an enterprise. Note that while an email may be described as transmitted "from a vendor," the email is actually transmitted with an email account that is associated with the vendor. Similarly, while an email may be described as transmitted "to an enterprise," the email is actually transmitted to an email account that is associated with the enterprise.

Initially, a threat detection platform can obtain an email that is addressed to an email account associated with an enterprise (step 701). As discussed above with reference to FIG. 1, the threat detection platform can obtain the email in several different ways. For example, the threat detection platform may be integrated into the email system of the enterprise via an API. In such embodiments, the threat detection platform may obtain the email via the API. Then, the threat detection platform can establish that the email is representative of an instance of outreach by a vendor (step 702). For example, the threat detection may determine, based on an analysis of the email, that the email was sent from an email address with a domain (e.g., @vendor.com) that is associated with the vendor.

Thereafter, the threat detection platform can access a federated database to identify a profile that is associated with the vendor (step 703). Generally, the federated database includes a series of profiles that are associated with different vendors. Each profile may include (i) a classification indicative of the risk in communicating with the corresponding vendor and (ii) information regarding how the classification was determined. This information may include (i) a record of vendor email accounts with which contact has been initiated on behalf of the vendor, (ii) a record of enterprise email accounts with which contact was initiated, or (iii) information regarding the types of attacks, if any, in which the vendor was found to be involved. As noted above, the threat detection platform may classify vendors as being "low," "medium," or "high" risk, or the threat detection platform may quantify the risk of vendors using a predefined scale (e.g., 1-5, 1-10, or 1-100). The classification itself is not important, so long as the threat detection platform can determine whether the risk is sufficiently high (e.g., in comparison to a programmed threshold) so as to merit further action to remediate the risk.

The threat detection platform can then determine, based on the profile, how to handle the email (step 704). For example, if the profile indicates that the risk in communicating with the vendor is high, then the threat detection platform may implement a filter so as to at least temporarily prohibit emails from the vendor from being received by employees of the enterprise. Moreover, this filter could be implemented across one or more other enterprises whose digital conduct is monitored by the threat detection platform. Thus, the threat detection platform may protect multiple enterprises against the threat posed by a compromised vendor even if those enterprises have not yet been the target of VAC attacks by the compromised vendor. As another example, if the profile indicates that the risk in communicating with the vendor is low, then the threat detection platform may allow the email to reach its intended destination, namely, the inbox of the email account.

In some embodiments, the federated database is employed as part of a multistage approach to determining how to handle the email. For example, the threat detection platform may apply a first model to the email to produce a first output indicative of whether the email is representative of a non-malicious email. If the threat detection platform determines, based on the first output, that the email is representative of a malicious email, then the threat detection platform may apply a second model to the email to produce a second output indicative of whether the email is representative of a given type of malicious email. The determination regarding how to handle the email may be based on the first output and/or the second output in addition to the profile for the vendor. Further information on multistage analysis of emails can be found in U.S. application Ser. No. 16/927,427, titled "Multistage Analysis of Emails to Identify Security Threats," which is incorporated by reference herein in its entirety.

Moreover, the threat detection platform can cause display of a notification by a computer program that specifies how the email was handled (step 705). Additional information regarding the vendor may be searchable or browsable through the computer program. For example, upon receiving, through the computer program, input indicative of a request to examine the profile associated with the vendor (step 706), the threat detection platform may cause display of an interface that includes a summary of the profile (step 707). Examples of such interfaces are shown in FIGS. 3 and 5.

FIG. 8 includes a flow diagram of a process 800 for generating a federated database from insights gained through examination of emails addressed to multiple enterprises. Initially, a threat detection platform can examine emails that are addressed to employees of multiple enterprises to discover a series of emails that represent instances of outreach by multiple vendors (step 801). As an example, assume that the threat detection platform is responsible for monitoring emails directed to employees of a first enterprise (Enterprise A) and a second enterprise (Enterprise B). While these the emails corresponding to each enterprise may be acquired and then examined in a siloed manner, each enterprise may receive emails from one or more vendors. Note, however, that the vendor(s) that have attempted to communicate with employees of Enterprise A may not necessarily be the same vendor(s) that have attempted to communicate with employees of Enterprise B.

For each vendor, the threat detection platform can produce a metric that is indicative of the risk in interacting with that vendor based on an analysis of all emails in the series of emails that involve that vendor (step 802). To accomplish this, the threat detection platform may provide those emails to a model as input. The metric may be produced by the model as output, or the metric may be based on an output produced by the model. Those skilled in the art will recognize that the emails from a vendor could be addressed to employees of Enterprise A, employees of Enterprise B, or employees of Enterprises A and B. The threat detection platform can then assign a classification to each vendor based on the corresponding metric (step 803). At a high level, the classification is representative of the risk posed by the corresponding vendor. Note that if an enterprise opts to federate its database, the profiles of respective vendors may be affected by activities involving other enterprises. For example, while the relationship between Enterprise A and Vendor C may be discrete from the relationship between Enterprise B and Vendor C, interactions between Enterprise A and Vendor C may affect the risk that is represented to Enterprise B (e.g., in the form of a score), and vice versa.

Thereafter, the threat detection platform can generate a federated database for the multiple vendors by populating entries in a data structure with information regarding those vendors (step 804). Each entry may be representative of a profile for the corresponding vendor. Each entry may include (i) an identifier (e.g., name) for the corresponding vendor, (ii) the classification assigned to the corresponding vendor, and (iii) a record of vendor email addresses from which contact has been initiated on behalf of the corresponding vendor. In some embodiments, each entry further includes (iv) a record of enterprise email addresses with which contact has been initiated by the corresponding vendor and (v) information regarding types of attacks, if any, that the corresponding vendor has participated in. As mentioned above, the record of enterprise email addresses may include email addresses associated with one or more enterprises. Meanwhile, the types of attacks may be determined based on outputs produced by models to which emails involving the corresponding vendor are provided as input. Assume, for example, that the threat detection platform discovers three emails that were transmitted from email addresses that are associated with the vendor. In that situation, the threat detection platform may provide those three emails to models that are designed and then trained to identify different types of attacks.

In some embodiments, the threat detection platform is able to cause display of a visual representation of the federated database on an interface that, when accessed via a computer program, conveys the risk in communicating with each vendor in a visual manner (step 805). An example of such an interface is shown in FIG. 4.

FIG. 9 includes a flow diagram of a process 900 for creating a federated database that can be used to establish the risk in interacting with vendors. While the process 900 is described in the context of generating a profile for a vendor whose behavior has been deemed suspicious, those skilled in the art will recognize that profiles could also be generated for vendors whose behavior is not suspicious. Thus, a threat detection platform could generate profiles for all vendors with which a given enterprise interacts.

Initially, a threat detection platform can obtain an email that originates from a domain associated with a vendor (step 901). Step 901 of FIG. 9 may be similar to step 701 of FIG. 7. Then, the threat detection platform can apply a model to the email to establish whether the email represents a risk to a recipient to whom the email is addressed (step 902). In some embodiments the model is designed to produce an output that indicates the likelihood that the email is malicious, while in other embodiments the model is designed to produce an output that indicates the likelihood that the email is a given type of malicious email. The output may be binary (e.g., malicious or not malicious, compromised or not compromised) or non-binary (e.g., a percent chance of being malicious, a percent chance of being compromised).

In some instances, the threat detection platform will determine that the email is malicious based on the output produced by the model (step 903). In such instances, the threat detection platform can create a profile for the vendor by populating a data structure with information regarding a feature of the email that influenced the output produced by the model (step 904). Alternatively, the threat detection platform may update the profile with this information if one already exists for the vendor. Generally, the feature is extracted, derived, or inferred from the email or its accompanying metadata. For example, the threat detection platform may discover that the model determined the email was malicious based on an unusual combination of vendor email address and geographical origin of the email. As another example, the threat detection platform may discover that the model determined the email was malicious based on an unusual combination of vendor email address and content of the email. This may occur if, for example, a vendor email address that has historically not been involved in correspondence related to payments is found to have transmitted an email seeking payment from an enterprise.

The threat detection platform can then store the profile in a federated database that includes a series of profiles (step 905). Each profile in the series of profiles may be associated with a different vendor whose digital conduct is being tracked by the threat detection platform. Moreover, as discussed above, the series of profiles included in the federated database may be created based on analyses of emails addressed to employees of multiple enterprises. Insights gained by the threat detection platform through analyses of these emails can be shared across the multiple enterprises.

Unless contrary to possibility, these steps could be performed in various sequences and combinations. For example, a threat detection platform may continually perform the processes of FIGS. 7, 8, and 9 such that profiles are constantly being created, updated, and employed for risk determination purposes. Other steps could also be included in some embodiments.

Processing System

Figure 10:
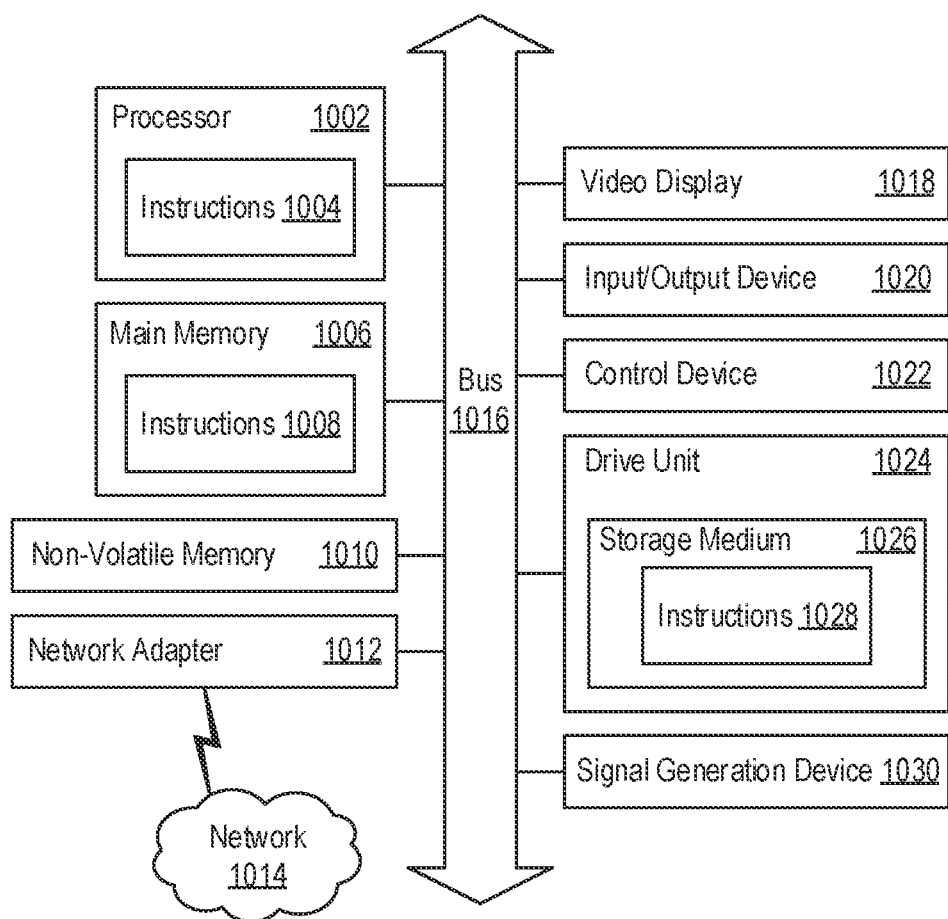
FIG. 10 is a block diagram illustrating an example of a processing system in which at least some operations described herein can be implemented.

FIG. 10 is a block diagram illustrating an example of a processing system 1000 in which at least some operations described herein can be implemented. For example, components of the processing system 1000 may be hosted on a computing device that includes a threat detection platform. As another example, components of the processing system 1000 may be hosted on a computing device that is queried by a threat detection platform to acquire emails, data, etc.

The processing system 1000 may include a central processing unit (also referred to as a "processor") 1002, main memory 1006, non-volatile memory 1010, network adapter 1012 (e.g., a network interface), video display 1018, input/output device 1020, control device 1022 (e.g., a keyboard or pointing device), drive unit 1024 including a storage medium 1026, and signal generation device 1030 that are communicatively connected to a bus 1016. The bus 1016 is illustrated as an abstraction that represents one or more physical buses or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

The processing system 1000 may share a similar processor architecture as that of a desktop computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1000.

While the main memory 1006, non-volatile memory 1010, and storage medium 1026 are shown to be a single medium, the terms "machine-readable medium" and "storage medium" should be taken to include a single medium or multiple media (e.g., a centralized/distributed database and/or associated caches and servers) that store one or more sets of instructions 1028. The terms "machine-readable medium" and "storage medium" shall also be taken to include any medium that is capable of storing, encoding, or carrying a set of instructions for execution by the processing system 1000.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in an electronic device. When read and executed by the processors 1002, the instruction(s) cause the processing system 1000 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 1010, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include a network adaptor card, a wireless network interface card, a router, an access point, a wireless router, a switch, a multilayer switch, a protocol converter, a gateway, a bridge, a bridge router, a hub, a digital media receiver, a repeater, or any combination thereof.

The network adapter 1012 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications (e.g., to regulate the flow of traffic and resource sharing between these entities). The firewall may additionally manage and/or have access to an access control list that details permissions including the access and operation rights of an object by an individual, a machine, or an application, and the circumstances under which the permission rights stand.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A system, comprising:
    a processor configured to:
        obtain an email that is addressed to an email account associated with a first enterprise;
        establish that the email represents an instance of outreach by a vendor
        access a federated database structured to consolidate vendor risk information among a plurality of distinct enterprises, the federated database being configured to identify a digital profile that is associated with the vendor, wherein:

the federated database includes multiple digital profiles that are associated with different vendors;

the digital profile of the vendor included in the multiple digital profiles includes federated content associated with the plurality of distinct enterprises and non-federated content, wherein the federated content includes (i) a classification indicative of risk in communicating with the vendor, and (ii) information regarding how the classification was determined; and the information regarding how the classification was determined comprises a timeline of activities associated with the vendor, the timeline including at least a first timeline entry corresponding to a report of an unusual activity of the vendor, the report having been received at the federated database from a second enterprise of the plurality of distinct enterprises, the second enterprise being different from the first enterprise associated with the email account, and the first timeline entry visually indicates an anonymized source identity corresponding to the second enterprise, and the timeline further includes a second timeline entry corresponding to an activity involving the vendor relevant to the first enterprise associated with the email account, the second timeline entry visually indicating a non-anonymized source identity corresponding to the first enterprise associated with the email account; and determine, based on the digital profile, how to handle the email; and a memory coupled to the processor and configured to provide the processor with instructions.

2. The system of claim 1, wherein the digital profile indicates that the risk in communicating with the vendor is high, and said determining comprises implementing a filter so as to at least temporarily prohibit incoming emails from the vendor from being received by employees of the first enterprise.

3. The system of claim 1, wherein the digital profile indicates that the risk in communicating with the vendor is low, and said determining comprises allowing the email to reach an inbox of the email account.

4. The system of claim 1, wherein said establishing is based on a determination that the email is sent from an email address with a domain that is associated with the vendor.

5. The system of claim 1, wherein the processor is further configured to:

apply a first model to the email to produce a first output indicative of whether the email is representative of a non-malicious email;

establish, based on the first output, that the email is representative of a malicious email; and apply a second model to the email to produce a second output indicative of whether the email is representative of a given type of malicious email;

wherein said determining how to handle the email is further based on at least one of the first output or the second output.

6. The system of claim 1, wherein the processor is further configured to cause display of a notification by a computer program that specifies how the email was handled.

7. The system of claim 6, wherein the processor is further configured to:

receive, through the computer program, input indicative of a request to examine the digital profile that is associated with the vendor; and cause display of an interface by the computer program that includes a summary of the digital profile.

8. The system of claim 7, wherein the summary includes a temporal record of past activities in which the vendor was involved.

9. The system of claim 1, wherein the federated database includes a record of email accounts with which contact has been initiated on behalf of the vendor, and wherein the record includes at least one email addressed to the first enterprise and at least one email addressed to the second enterprise.

10. A method comprising:

obtaining an email that is addressed to an email account associated with a first enterprise;

establishing that the email represents an instance of outreach by a vendor;

accessing a federated database structured to consolidate vendor risk information among a plurality of distinct enterprises, the federated database being configured to identify a digital profile that is associated with the vendor, wherein:

the federated database includes multiple digital profiles that are associated with different vendors;

the digital profile of the vendor included in the multiple digital profiles includes federated content associated with the plurality of distinct enterprises and non-federated content, wherein the federated content includes (i) a classification indicative of risk in communicating with the vendor, and (ii) information regarding how the classification was determined; and the information regarding how the classification was determined comprises a timeline of activities associated with the vendor, the timeline including at least a first timeline entry corresponding to a report of an unusual activity of the vendor, the report having been received at the federated database from a second enterprise of the plurality of distinct enterprises, the second enterprise being different from the first enterprise associated with the email account, and the first timeline entry visually indicates an anonymized source identity corresponding to the second enterprise, and the timeline further includes a second timeline entry corresponding to an activity involving the vendor relevant to the first enterprise associated with the email account, the second timeline entry visually indicating a non-anonymized source identity corresponding to the first enterprise associated with the email account; and determining, based on the digital profile, how to handle the email.

11. The method of claim 10, wherein the digital profile indicates that the risk in communicating with the vendor is high, and said determining comprises implementing a filter so as to at least temporarily prohibit incoming emails from the vendor from being received by employees of the first enterprise.

12. The method of claim 10, wherein the digital profile indicates that the risk in communicating with the vendor is low, and said determining comprises allowing the email to reach an inbox of the email account.

13. The method of claim 10, wherein said establishing is based on a determination that the email is sent from an email address with a domain that is associated with the vendor.

14. The method of claim 10, further comprising:

applying a first model to the email to produce a first output indicative of whether the email is representative of a non-malicious email;

establishing, based on the first output, that the email is representative of a malicious email; and applying a second model to the email to produce a second output indicative of whether the email is representative of a given type of malicious email;

wherein said determining how to handle the email is further based on at least one of the first output or the second output.

15. The method of claim 10, further comprising causing display of a notification by a computer program that specifies how the email was handled.

16. The method of claim 15, further comprising:

receiving, through the computer program, input indicative of a request to examine the digital profile that is associated with the vendor; and causing display of an interface by the computer program that includes a summary of the digital profile.

17. The method of claim 16, wherein the summary includes a temporal record of past activities in which the vendor was involved.

18. The method of claim 10, wherein the federated database includes a record of email accounts with which contact has been initiated on behalf of the vendor, and wherein the record includes at least one email addressed to the first enterprise and at least one email addressed to the second enterprise.

19. A computer program product embodied in a tangible non-transitory computer readable storage medium and comprising computer instructions for:

obtaining an email that is addressed to an email account associated with a first enterprise;

establishing that the email represents an instance of outreach by a vendor;

accessing a federated database structured to consolidate vendor risk information among a plurality of distinct enterprises, the federated database being configured to identify a digital profile that is associated with the vendor, wherein:

the federated database includes multiple digital profiles that are associated with different vendors;

the digital profile of the vendor included in the multiple digital profiles includes federated content associated with the plurality of distinct enterprises and non-federated content, wherein the federated content includes (i) a classification indicative of risk in communicating with the vendor, and (ii) information regarding how the classification was determined; and the information regarding how the classification was determined comprises a timeline of activities associated with the vendor, the timeline including at least a first timeline entry corresponding to a report of an unusual activity of the vendor, the report having been received at the federated database from a second enterprise of the plurality of distinct enterprises, the second enterprise being different from the first enterprise associated with the email account, and the first timeline entry visually indicates an anonymized source identity corresponding to the second enterprise, and the timeline further includes a second timeline entry corresponding to an activity involving the vendor relevant to the first enterprise associated with the email account, the second timeline entry visually indicating a non-anonymized source identity corresponding to the first enterprise associated with the email account; and determining, based on the digital profile, how to handle the email.

20. A computer program product of claim 19, wherein determining, based on the digital profile, how to handle the email includes determining to implement a filter to at least temporarily prohibit incoming emails from the vendor from being received by employees of the first enterprise.

* * * * *